US009637890B2

(12) United States Patent
Hirozawa

(10) Patent No.: US 9,637,890 B2
(45) Date of Patent: May 2, 2017

(54) POWER TRANSMISSION DEVICE AND HYBRID CONSTRUCTION MACHINE PROVIDED THEREWITH

(71) Applicant: KOBELCO CONSTRUCTION MACHINERY CO., LTD., Hiroshima (JP)

(72) Inventor: Mitsunori Hirozawa, Hiroshima (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 0 days.

(21) Appl. No.: 14/387,436

(22) PCT Filed: Mar. 6, 2013

(86) PCT No.: PCT/JP2013/001410
§ 371 (c)(1),
(2) Date: Sep. 23, 2014

(87) PCT Pub. No.: WO2013/145575
PCT Pub. Date: Oct. 3, 2013

(65) Prior Publication Data
US 2015/0090506 A1    Apr. 2, 2015

(30) Foreign Application Priority Data
Mar. 26, 2012    (JP) ................. 2012-068717

(51) Int. Cl.
*B60K 6/22*    (2007.10)
*E02F 9/20*    (2006.01)
(Continued)

(52) U.S. Cl.
CPC .............. *E02F 9/2075* (2013.01); *B60K 6/22* (2013.01); *B60K 6/30* (2013.01); *B60K 6/387* (2013.01);
(Continued)

(58) Field of Classification Search
CPC ....... E02F 9/2075; B60K 6/445; B60K 6/387; B60K 6/54; B60K 6/46; B60K 6/22;
(Continued)

(56) References Cited

U.S. PATENT DOCUMENTS 6,225,784 B1 * 5/2001 Kinoshita et al. ............ 320/132
6,522,024 B1    2/2003 Takaoka et al.
(Continued)

FOREIGN PATENT DOCUMENTS

CN    1922782 A    2/2007
CN    102134868 A    7/2011
(Continued)

OTHER PUBLICATIONS

Office Action issued Sep. 29, 2015 in Japanese Patent Application No. 2012-068717 (with English summary).
(Continued)

*Primary Examiner* — Hau Phan
*Assistant Examiner* — Jacob Meyer
(74) *Attorney, Agent, or Firm* — Oblon, McClelland, Maier & Neustadt, L.L.P.

(57) ABSTRACT

A configuration is provided to directly utilize the power of an engine as the power of a hydraulic pump, and to efficiently perform power generation and engine assist. The configuration is provided with an engine; a generator which is configured to generate electric power by an operation of the generator using the power of the engine; a battery which is configured to store the electric power generated by the generator; a motor which is configured to be operated by the power of the engine and by the electric power of the battery; a hydraulic pump connected to the motor so as to be driven by operation of the motor; and a power divider connected to the engine, the generator, and the motor so that the power of the engine is distributed to the generator and to the motor.

6 Claims, 7 Drawing Sheets

(51) Int. Cl.
  *B60K 6/30* (2007.10)
  *B60K 6/46* (2007.10)
  *B60W 10/06* (2006.01)
  *B60W 20/00* (2016.01)
  *B60K 6/387* (2007.10)
  *B60K 6/445* (2007.10)
  *B60K 6/54* (2007.10)
  *B60W 10/103* (2012.01)
  *F02D 29/04* (2006.01)
  *F02D 29/06* (2006.01)

(52) U.S. Cl.
  CPC ............... *B60K 6/445* (2013.01); *B60K 6/46* (2013.01); *B60K 6/54* (2013.01); *B60W 10/06* (2013.01); *B60W 10/103* (2013.01); *B60W 20/00* (2013.01); *E02F 9/202* (2013.01); *B60W 2300/17* (2013.01); *F02D 29/04* (2013.01); *F02D 29/06* (2013.01); *Y02T 10/6239* (2013.01)

(58) Field of Classification Search
  CPC ....... B60K 6/30; B60W 10/103; B60W 10/06; B60W 20/00; B60W 2300/17; F02D 29/06; F02D 29/04; Y02T 10/6208; Y02T 10/6282
  See application file for complete search history.

(56) References Cited

U.S. PATENT DOCUMENTS

| | | | |
|---|---|---|---|
| 6,666,022 B1* | 12/2003 | Yoshimatsu et al. | 60/413 |
| 6,789,335 B1* | 9/2004 | Kinugawa et al. | 37/348 |
| 6,922,990 B2* | 8/2005 | Naruse et al. | 60/414 |
| 7,069,673 B2* | 7/2006 | Kagoshima et al. | 37/348 |
| 7,086,226 B2* | 8/2006 | Oguri | E02F 9/2075 60/414 |
| 7,556,120 B2* | 7/2009 | Sah | B60K 6/40 180/305 |
| 7,565,801 B2* | 7/2009 | Tozawa | E02F 9/2075 60/414 |
| 8,167,078 B2* | 5/2012 | Futahashi | B60K 6/12 180/306 |
| 8,405,328 B2* | 3/2013 | Komiyama et al. | 318/369 |
| 8,739,906 B2* | 6/2014 | Kawashima | B60K 6/485 180/53.1 |
| 8,909,434 B2* | 12/2014 | Anders | E02F 9/2075 701/50 |
| 9,013,051 B2* | 4/2015 | Yamashita et al. | 290/40 R |
| 9,077,272 B2* | 7/2015 | Hirozawa | |
| 2001/0019980 A1* | 9/2001 | Kanehisa | B60K 6/365 475/5 |
| 2003/0132729 A1 | 7/2003 | Yoshimatsu | |
| 2004/0098983 A1* | 5/2004 | Naruse et al. | 60/428 |
| 2006/0096799 A1* | 5/2006 | Tatsuno et al. | 180/305 |
| 2007/0029122 A1 | 2/2007 | Suzuki | |
| 2007/0090650 A1 | 4/2007 | Komiyama et al. | |
| 2007/0187180 A1* | 8/2007 | Kagoshima | B60K 6/12 182/232 |
| 2008/0018271 A1* | 1/2008 | Morinaga et al. | 318/257 |
| 2008/0111508 A1* | 5/2008 | Dasgupta et al. | 318/139 |
| 2008/0201045 A1 | 8/2008 | Kagoshima et al. | |
| 2011/0057596 A1* | 3/2011 | Kagoshima | 318/490 |
| 2011/0227512 A1* | 9/2011 | Komiyama et al. | 318/369 |
| 2011/0254513 A1* | 10/2011 | Kagoshima | 320/162 |
| 2011/0288711 A1* | 11/2011 | Yanagisawa | 701/22 |
| 2012/0104770 A1* | 5/2012 | Jacob | 290/40 B |
| 2012/0109472 A1* | 5/2012 | Yanagisawa | 701/50 |
| 2013/0151087 A1* | 6/2013 | Doi et al. | 701/50 |
| 2013/0307443 A1* | 11/2013 | Hirozawa | 318/139 |
| 2014/0054902 A1* | 2/2014 | Kawaguchi et al. | 290/40 B |
| 2014/0183876 A1* | 7/2014 | Yamashita et al. | 290/36 R |
| 2014/0277970 A1* | 9/2014 | Sakamoto et al. | 701/50 |

FOREIGN PATENT DOCUMENTS

| | | | |
|---|---|---|---|
| DE | 10 2010 004 596 A1 | 7/2011 | |
| DE | 20 2011 107 327 U1 | 3/2012 | |
| DE | 202011107327 U1 * | 3/2012 | |
| EP | 1 143 134 A1 | 10/2001 | |
| EP | 1 775 392 A2 | 4/2007 | |
| EP | 1 775 392 A3 | 4/2007 | |
| EP | 1 961 869 A1 | 8/2008 | |
| JP | 2001 329573 | 11/2001 | |
| JP | 2003 9308 | 1/2003 | |
| JP | 2005 194978 | 7/2005 | |
| JP | 2005194978 A * | 7/2005 | |
| JP | 2006-273516 A | 10/2006 | |
| JP | 2006-273517 A | 10/2006 | |
| JP | 2006-336845 A | 12/2006 | |
| JP | 2007 146620 | 6/2007 | |
| JP | 2007146620 A * | 6/2007 | |

OTHER PUBLICATIONS

Extended European Search Report issued Jul. 8, 2015 in Patent Application No. 13768052.6.
Partial Supplementary Search Report issued Feb. 20, 2015 in European Patent Application No. 13768052.6.
International Search Report Issued Apr. 9, 2013 in PCT/JP13/001410 Filed Mar. 6, 2013.
Japanese Office Action issued Feb. 9, 2016 in Patent Application No. 2012-068717 (with unedited computer generated English translation).

* cited by examiner

POWER TRANSMISSION DEVICE AND HYBRID CONSTRUCTION MACHINE PROVIDED THEREWITH

TECHNICAL FIELD

The present invention relates to a hybrid construction machine provided with an engine, a generator which generates electric power by the power of the engine, and a hydraulic pump which is drivable by the electric power generated by the generator.

BACKGROUND ART

Conventionally, there are known, as the hybrid construction machine, a construction machine employing a series hybrid system, and a construction machine employing a parallel hybrid system.

An example of a construction machine employing a series hybrid system is disclosed in patent literature 1. Specifically, the construction machine disclosed in patent literature 1 is provided with an engine, a generator to be driven by the engine, a motor to which electric power generated by the generator is supplied, and a hydraulic pump to be driven by the motor. In the construction machine employing a series hybrid system, the engine and the hydraulic pump are not mechanically connected to each other.

On the other hand, the construction machine employing a parallel hybrid system is provided with an engine, a hydraulic pump to be driven by the engine, and a generator-motor which is operated as a generator by the power of the engine for storing electric power in a battery, and which is operated as a motor by the electric power from the battery for assisting the engine which drives the hydraulic pump.

In the construction machine employing a series hybrid system, however, the engine and the hydraulic pump are not mechanically connected to each other. Therefore, it is impossible to directly utilize the power of the engine as the power of the hydraulic pump. Accordingly, high output is required for the motor in order to drive the hydraulic pump, which results in an increase in the size of the motor. As a result, the degree of freedom of layout may be lowered. Further, even if there is sufficient output of the engine, it is impossible to directly transmit the engine power to the hydraulic pump. Further, when disorder occurs in the electrical system, it is difficult to perform emergency evacuation by driving the hydraulic pump.

On the other hand, in the construction machine employing a parallel hybrid system, one generator-motor serves as a generator and a motor. Therefore, it is impossible to efficiently use the generator-motor. Specifically, whereas the output of a generator-motor at the time of generating electric power, and the output of the generator-motor at the time of assisting the engine differ from each other, one rated output is set for the generator-motor. Accordingly, it is impossible to effectively utilize the rated output at the time of generating electric power and at the time of assisting the engine.

CITATION LIST

Patent Literature

Patent literature 1: Japanese Unexamined Patent Publication No. 2001-329573

SUMMARY OF INVENTION

An object of the invention is to provide a power transmission device that enables to directly utilize the power of an engine as the power of a hydraulic pump, and enables to efficiently perform power generation and power assist, and a hybrid construction machine provided with the power transmission device.

In view of the above, the invention provides a power transmission device for use in a hybrid construction machine. The power transmission device is provided with an engine; a generator which is configured to generate electric power by operation of the generator using power of the engine; a battery which is configured to store the electric power generated by the generator; a motor which is configured to be operated by the power of the engine and by the electric power of the battery; a hydraulic pump connected to the motor so as to be driven by operation of the motor; and a power divider connected to the engine, the generator, and the motor so that the power of the engine is distributed to the generator and to the motor.

Further, the invention provides a hybrid construction machine provided with a hydraulic actuator, and the power transmission device including the hydraulic pump which drives the hydraulic actuator.

According to the invention, it is possible to directly utilize the power of the engine as the power of the hydraulic pump, and to efficiently perform power generation and power assist.

DESCRIPTION OF EMBODIMENTS

Figure 1:
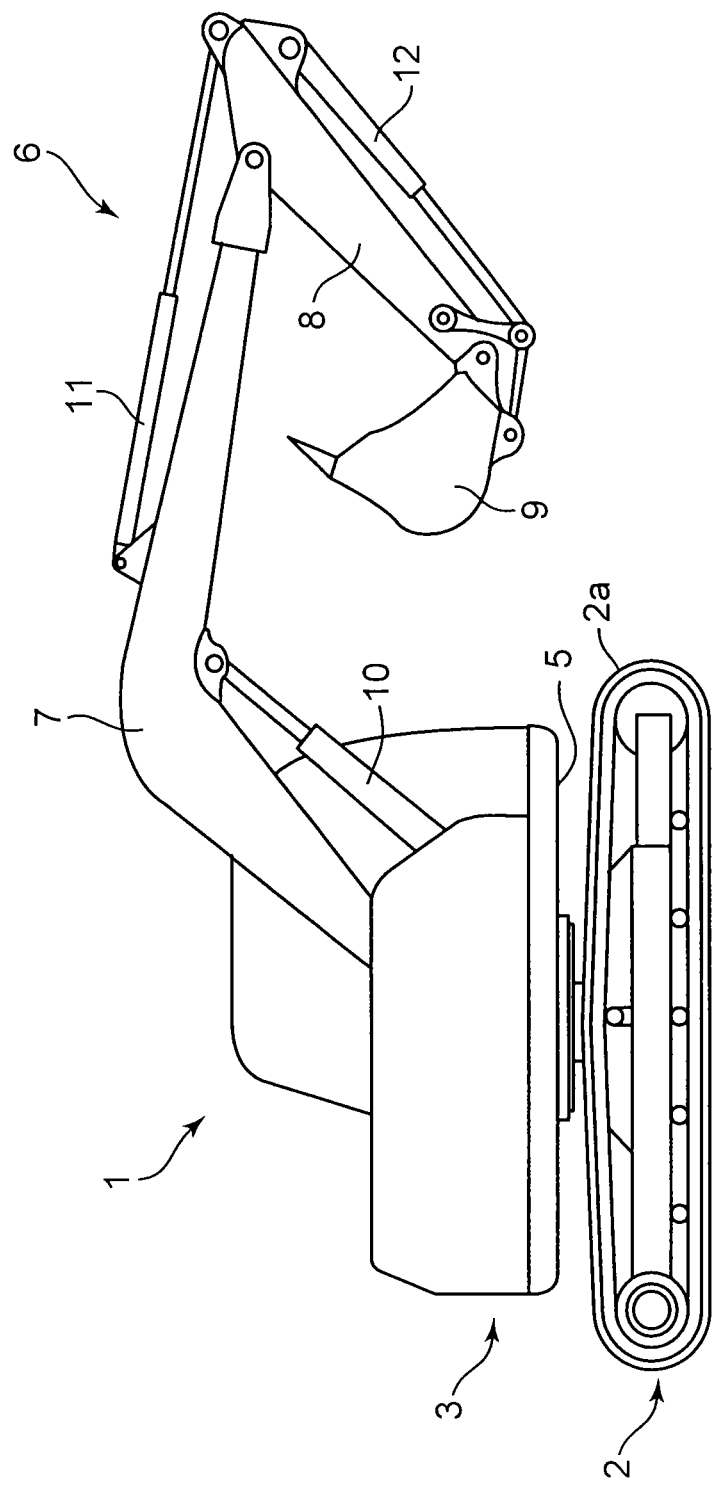
FIG. 1 is a right side view illustrating an overall configuration of a hybrid shovel according to an embodiment of the invention.

In the following, an embodiment of the invention is described referring to the drawings. The following embodiment is merely an example embodying the invention, and does not limit the technical range of the invention.

Figure 2:
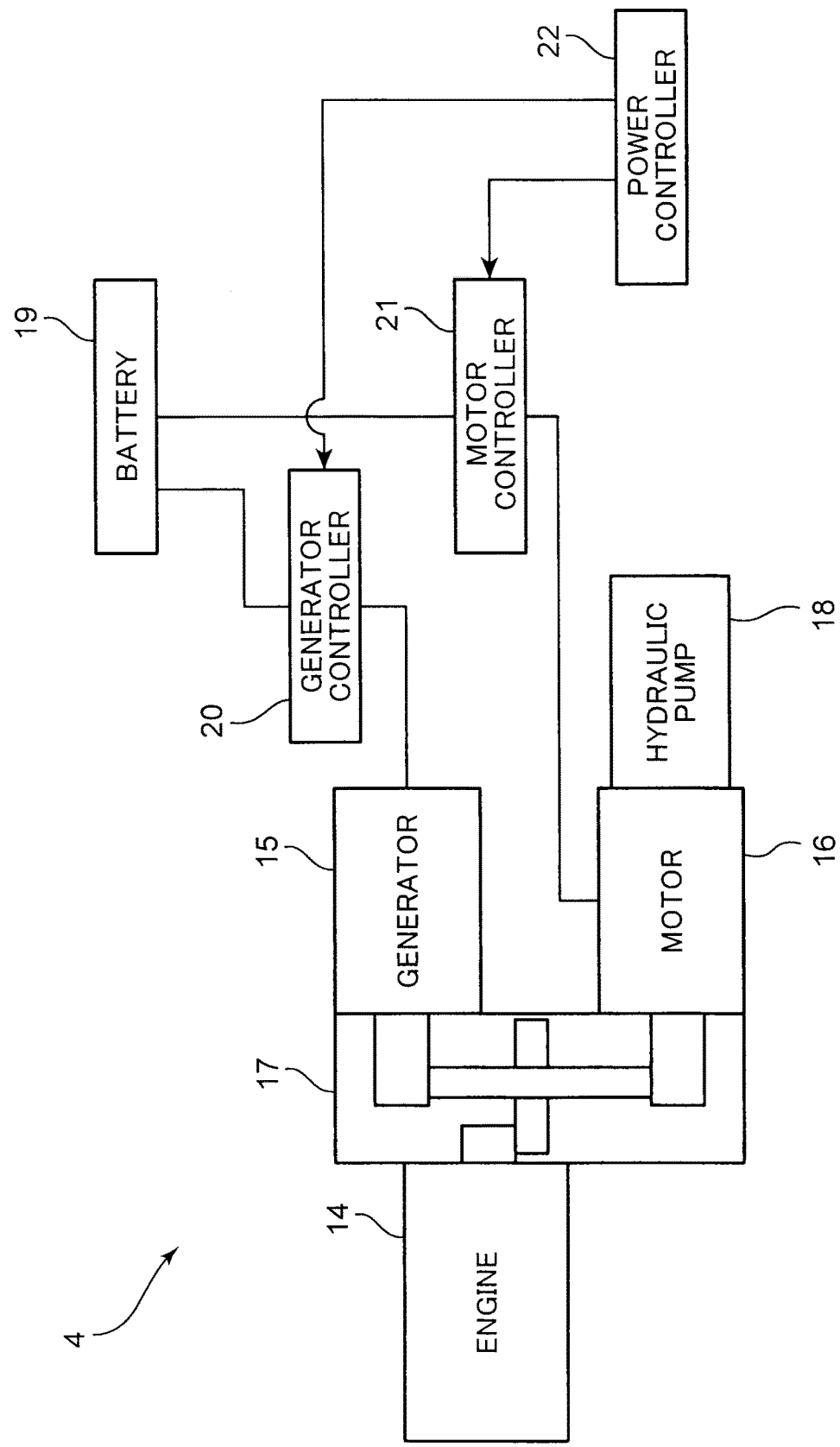
FIG. 2 is a block diagram illustrating a schematic configuration of a power transmission device provided in the hybrid shovel illustrated in FIG. 1.

A hybrid shovel 1 as an example of a hybrid construction machine of the invention is provided with a self-propelled lower propelling body 2, an upper slewing body 3 mounted on the lower propelling body 2 to be slewable, and a power transmission device 4 illustrated in FIG. 2.

The lower propelling body 2 is provided with a pair of left and right crawlers 2a, and unillustrated drive motors provided respectively for the crawlers 2a.

The upper slewing body 3 is provided with an upper frame 5 mounted on the lower propelling body 2 to be slewable, an unillustrated slewing motor which is driven to slew the upper frame 5 with respect to the lower propelling body 2, and a working attachment 6 mounted on the upper frame 5 to be raised and lowered.

The working attachment 6 includes a boom 7 having a base end portion attached to the upper frame 5 to be raised and lowered, an arm 8 having a base end portion mounted to a distal end portion of the boom 7 to be swingable, and a bucket 9 mounted on a distal end portion of the arm 8 to be swingable. The working attachment is further provided with a boom cylinder 10 for raising and lowering the boom 7 with respect to the upper frame 5, an arm cylinder 11 for swinging the arm 8 with respect to the boom 7, and a bucket cylinder 12 for swinging the bucket 9 with respect to the arm 8.

The drive motors (not illustrated) of the lower propelling body 2, the slewing motor (not illustrated) of the upper slewing body 3, and the cylinders 10 to 12 constitute hydraulic actuators in the embodiment.

The power transmission device 4 is provided with an engine 14, a generator 15 which is configured to generate electric power by operation of the generator 15 by the power of the engine 14, a battery 19 configured to store the electric power generated by the generator 15, a motor 16 which is configured to be operated by the power of the engine 14 and by the electric power of the battery 19, a hydraulic pump 18 connected to the motor 16 so as to be driven by operation of the motor 16, a power divider 17 configured to distribute the power of the engine 14, a generator controller 20 configured to control driving of the generator 15, a motor controller 21 configured to control driving of the motor 16, and a power controller 22 configured to output a control command to the generator controller 20 and to the motor controller 21.

The generator 15 is connected to the engine 14 via the power divider 17 so that the power from the engine 14 is receivable.

The battery 19 is configured to store the electric power generated by the generator 15, and to supply the stored electric power to the motor 16. Specifically, the battery 19 is electrically connected to the generator 15 and to the motor 16.

The motor 16 is connected to the engine 14 via the power divider 17 so that the power from the engine 14 is receivable. Further, the motor 16 is configured to supply the power from the motor 16 in addition to the power from the engine 14 to the hydraulic pump 18 by receiving the electric power from the battery 19 in a state that the power from the engine 14 is received. (In other words, the motor 16 is capable of assisting the engine 14).

The hydraulic pump 18 is configured to eject hydraulic oil for use in driving at least one of the hydraulic actuators (the drive motors (not illustrated), the slewing motor (not illustrated), and the cylinders 10 to 12).

The power divider 17 is configured to distribute the power of the engine 14 to the generator 15 and to the motor 16. Specifically, the power divider 17 has a gear mechanism for distributing the power of the engine 14 to two systems. The power divider 17 in the embodiment has a gear mechanism, in which the gear ratio between the number of rotations of the engine 14, and the number of rotations of the generator 15 and the motor 16 is 1:1. Thus, the power of the engine 14 is distributed to the generator 15 and to the motor 16 in a state that the number of rotations of the engine 14 is maintained.

The generator controller 20 is configured to control the power generation amount by the generator 15. Specifically, the generator controller 20 is configured to control the torque with respect to the generator 15. The generator controller 20 may be constituted of an inverter, for instance.

The motor controller 21 is configured to control driving of the motor 16. Specifically, the motor controller 21 is configured to control the electric current to be supplied from the battery 19 to the motor 16. The motor controller 21 may be constituted of an inverter, for instance.

The power controller 22 is configured to output a control command to the generator controller 20 and to the motor controller 21 in accordance with an operation state of the engine 14. Specifically, the power controller 22 outputs a control command to the generator controller 20 for generating electric power, when there is sufficient power of the engine 14. On the other hand, the power controller 22 is configured to output a control command to the motor controller 21 for assisting the engine 14 by the motor 16, when there is not sufficient power of the engine 14.

As described above, in the embodiment, the generator 15 for generating electric power, and the motor 16 for assisting the engine 14 are individually provided, and the generator 15 and the motor 16 are connected to the engine 14 via the power divider 17. According to this configuration, it is possible to directly utilize the power of the engine 14 as the power of the motor 16 (the hydraulic pump 18), while generating electric power by the power of the engine 14. On the other hand, it is possible to drive the hydraulic pump 18 by operating the motor 16 by the electric power of the battery 19. In other words, it is possible to assist the engine 14.

According to the above configuration, unlike a series hybrid system, the embodiment provides the following advantageous effects. Specifically, it is possible to directly utilize the power of the engine 14 as the power of the hydraulic pump 18. Therefore, it is possible to suppress the output required for the motor 16, and to reduce the size of the motor 16. Further, when there is sufficient output of the engine 14, or when disorder occurs in the electrical system, it is possible to drive the hydraulic pump 18 with use of the power of the engine 14.

Further, unlike a parallel hybrid system, the embodiment provides the following advantageous effects. Specifically, in the embodiment, the generator 15 for generating electric power, and the motor 16 for assisting the engine are individually provided. Accordingly, it is possible to efficiently perform power generation and engine assist by selecting the generator 15 having a rated output in accordance with the output at the time of generating electric power, and by selecting the motor 16 having a rated output in accordance with the output at the time of assisting the engine.

Figure 4:
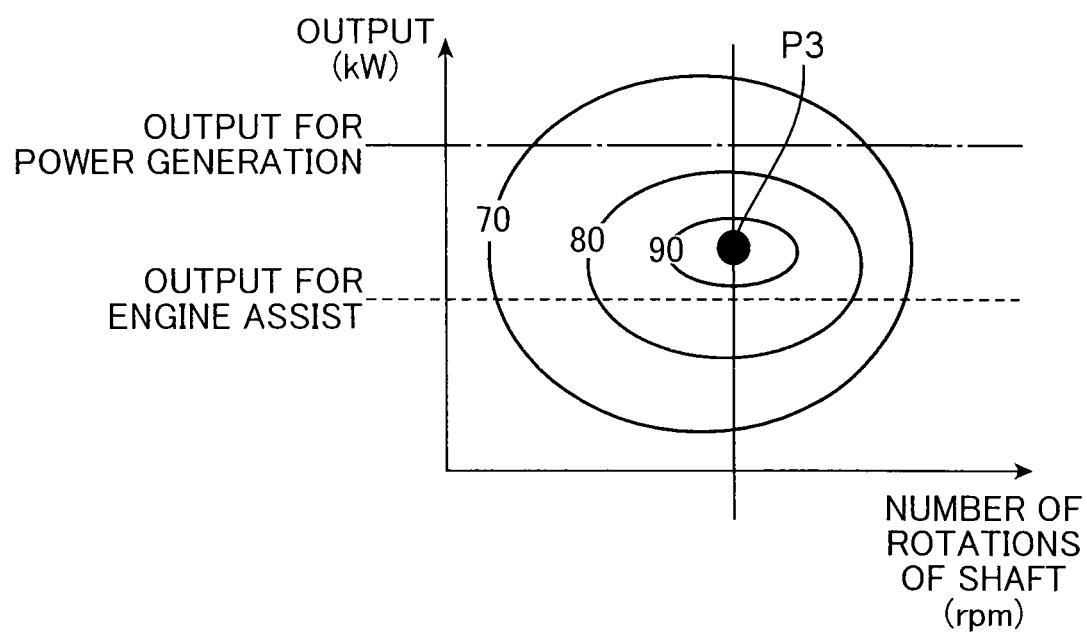
FIG. 4 is a graph illustrating the driving efficiency of a generator-motor of a hybrid shovel employing a parallel system.

Specifically, for instance, let us assume that the output for generating electric power is larger than the output for assisting the engine. In this case, if the function as a generator and the function as a motor are commonly provided in a generator-motor like a parallel hybrid system, as illustrated in FIG. 4, it is impossible to effectively utilize a rated output P3 of the generator-motor. In other words, what is selectable in this case is at most a generator-motor having a rated output between the output for generating electric power and the output for assisting the engine.

Figure 3:
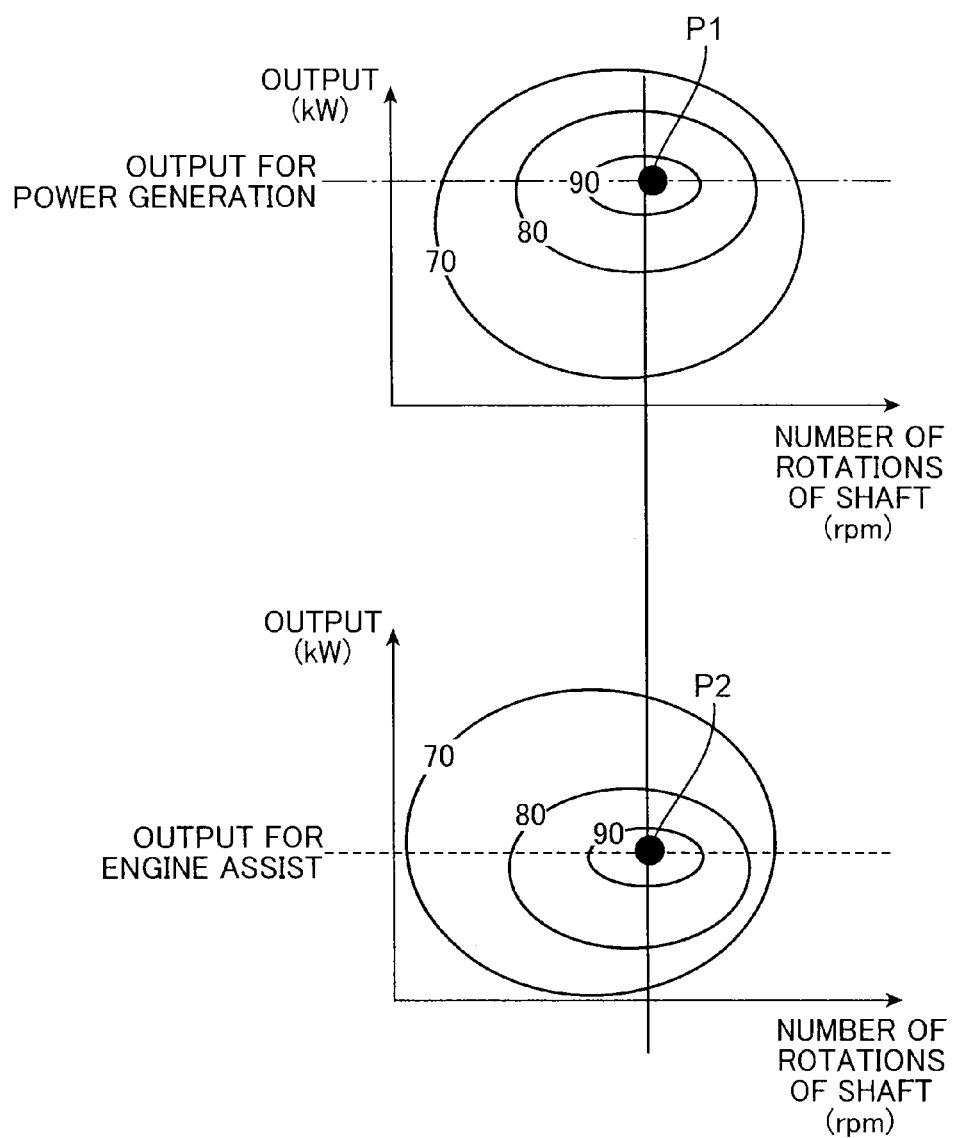
FIG. 3 is a graph illustrating the driving efficiency of a generator illustrated in FIG. 2, and the driving efficiency of a motor illustrated in FIG. 2.

Contrary to the above, in the embodiment, as illustrated in FIG. 3, it is possible to efficiently perform power generation and engine assist by selecting the generator 15 having a rated output P1 corresponding to the output for generating electric power, and by selecting the motor 16 having a rated output P2 corresponding to the output for assisting the engine.

Thus, according to the embodiment, it is possible to directly utilize the power of the engine 14 as the power of the hydraulic pump 18, and to efficiently perform power generation and engine assist.

Figure 5:
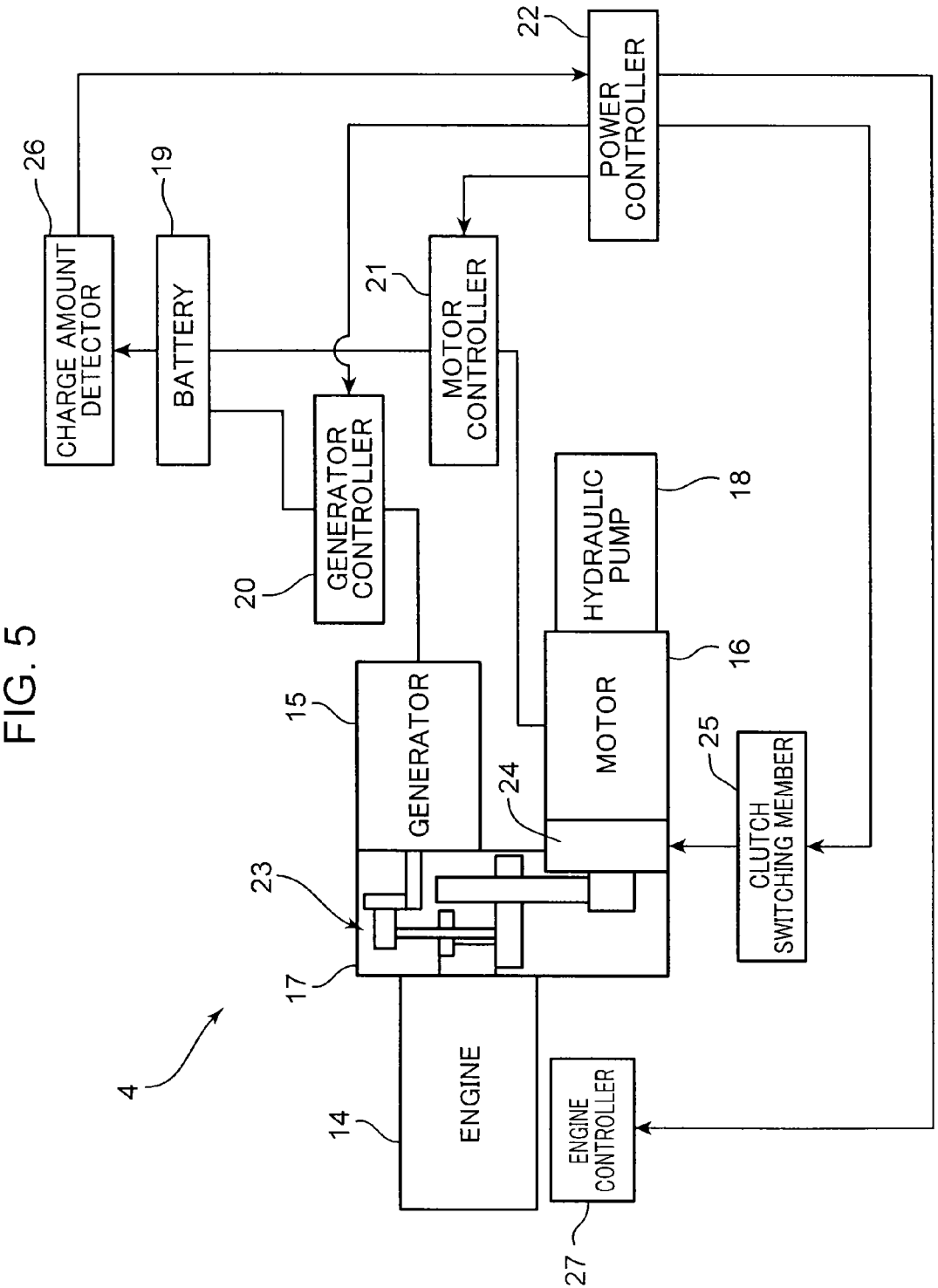
FIG. 5 is a block diagram illustrating a schematic configuration of a power transmission device as a modification of the embodiment illustrated in FIG. 2.

In the following, a modified embodiment is described referring to FIG. 5. The same elements in the modified embodiment as those in the foregoing embodiment are indicated with the same reference signs, and the description thereof is omitted herein.

A power transmission device 4 in the modified embodiment is provided with an acceleration mechanism (a variable speed mechanism) 23 provided in the power divider 17, a clutch 24 provided between the power divider 17 and the motor 16, a clutch switching member 25 configured to cause the clutch 24 to perform a switching operation, an engine controller 27 configured to control driving of the engine 14, and a charge amount detector 26 configured to detect an amount of charge of the battery 19.

The acceleration mechanism 23 is configured to change the number of rotations of the engine 14 in such a manner that the number of rotations of the generator 15 is larger than the number of rotations of the motor 16. Specifically, the acceleration mechanism 23 is configured to transmit the power of the engine 14 to the generator 15 in a state that the number of rotations of the engine 14 is increased. The acceleration mechanism 23 in the modified embodiment has a gear mechanism having a gear ratio of 1:2.5 so that the number of rotations (5,000 rpm) of the generator 15 is equal to 2.5 times of the number of rotations (e.g. 2,000 rpm) of the engine 14. As well as the case illustrated in FIG. 2, the number of rotations of the motor 16 to be operated by the power of the engine 14 is substantially the same as the number of rotations of the engine 14.

Figure 6:
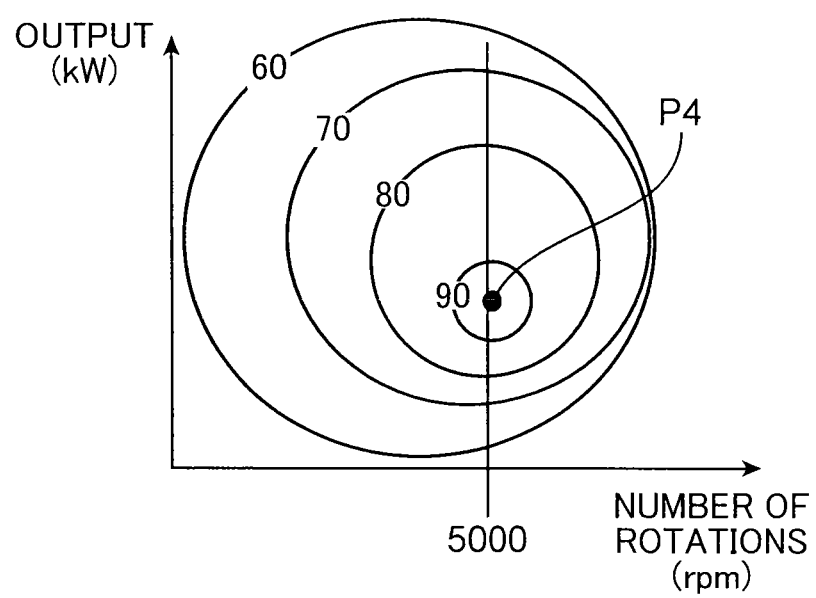
FIG. 6 is a graph illustrating the driving efficiency of a generator illustrated in FIG. 5.

In other words, in the modified embodiment, the number of rotations of the generator 15 is set to be larger than the number of rotations of the motor 16 by the acceleration mechanism 23. Accordingly to this configuration, it is possible to reduce the size of the generator 15 and to enhance the power generation efficiency. Specifically, if the number of rotations of the generator 15 can be increased in obtaining a required output, it is possible to reduce the capacity of the generator 15. This makes it possible to reduce the size of the generator. Further, as illustrated in FIG. 6, the larger the number of rotations of the generator 15 is, the easier it is to drive the generator 15 with high efficiency. Accordingly, increasing the number of rotations of the generator 15 makes it possible to enhance the power generation efficiency. Specifically, in the modified embodiment, as illustrated in FIG. 6, there is selected the generator 15 having a rated output P4 is obtained when the number of rotations of the generator 15 is 5,000 rpm.

Further, in the modified embodiment, it is possible to increase the number of rotations (5,000 rpm) of the generator 15 with respect to the number of rotations (2,000 rpm) of the engine 14 as a reference, and to maintain the number of rotations (2,000 rpm) of the motor. According to this configuration, it is possible to utilize the hydraulic pump for use in a construction machine configured such that the engine and the hydraulic pump are directly connected to each other, without changing the specifications of the hydraulic pump, while reducing the size of the generator 15 and enhancing the power generation efficiency as described above. Thus, it is possible to commonalize the hydraulic pump 18 for a plurality of kinds of construction machines.

The clutch 24 is switchable between a connected state in which a power transmission route between the power divider 17 and the motor 16 is connected, and a disconnected state in which the power transmission route between the power divider 17 and the motor 16 is disconnected.

The clutch switching member 25 is configured to supply power to the clutch 24 for a switching operation. For instance, the clutch switching member 25 may be constituted of a pressing member such as a cylinder which mechanically applies a pressing force to the clutch 24, or a control valve configured to control the flow rate of working fluid with respect to the clutch, when the clutch is operable by working fluid.

The engine controller 27 is configured to control the number of rotations of the engine 14 (including driving or stopping the engine 14).

The charge amount detector 26 is configured to electrically detect an amount of charge of the battery 19. The charge amount detector 26 may detect a temperature of the battery 19, and may calculate an amount of charge based on the detected temperature. Further, the charge amount detector 26 is not required to be provided independently of controllers 20 to 22. For instance, one of the controllers 20 to 22 may constitute a charge amount detector.

The power controller 22 in the modified embodiment is configured to output a control command to the clutch switching member 25, the motor controller 21, and the engine controller 27, based on a detection result from the charge amount detector 26. Specifically, the power controller 22 is configured to output control signals for allowing the clutch 24 to switch to a disconnected state, for allowing the motor to operate by the electric power of the battery 19, and for allowing the engine 14 to stop, when the amount of charge of the battery 19 detected by the charge amount detector 26 is not smaller than a predetermined value.

Figure 7:
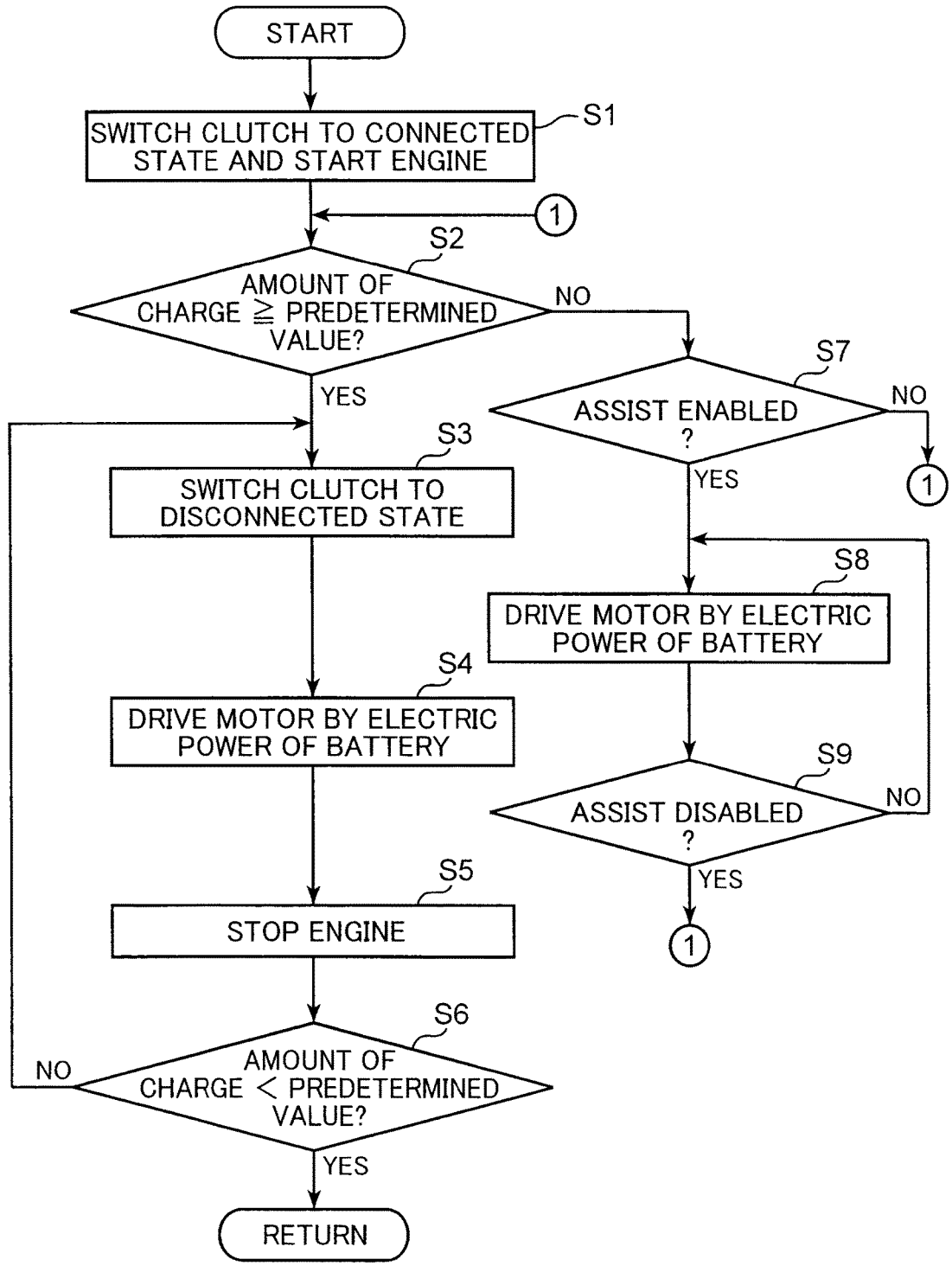
FIG. 7 is a flowchart illustrating a process to be executed by a power controller illustrated in FIG. 5.

In the following, a process to be executed by the power controller 22 is described referring to FIG. 7.

The process to be executed by the power controller 22 is started after the condition for starting the engine 14 is established. When the process is started, first of all, the clutch 24 is switched to a connected state, and the engine 14 is started (in Step S1). Subsequently, it is determined whether an amount of charge detected by the charge amount detector 26 is not smaller than a predetermined value (in Step S2).

When it is determined that the amount of charge is not smaller than the predetermined value in Step S2, the clutch 24 is switched to the disconnected state (in Step S3), and the motor 16 is driven by the electric power of the battery 19 (in Step S4). Further, the engine 14 is stopped (in Step S5). By performing Steps S3 to S5, when there is sufficient amount of charge in the battery 19, it is possible to drive the hydraulic pump 18 in a state that the engine 14 is stopped. Thus, it is possible to enhance the fuel consumption rate. Steps S3 to S5 are continuously executed until the amount of charge of the battery 19 is smaller than the predetermined value (as long as it is determined NO in Step S6). On the other hand, when the amount of charge of the battery 19 is smaller than the predetermined value (YES in Step S6), the process returns to Step S1.

When it is determined that the amount of charge is smaller than the predetermined value in Step S2, it is determined whether it is possible to assist the engine by the motor 16 (in Step S7). In other words, in Step S7, it is judged whether assisting the engine by the motor 16 is enabled, based on the amount of charge of the battery 19 and based on the driving state of the engine 14 (including the load by the hydraulic pump 18). When it is determined that assisting the engine is enabled in Step S7, the motor 16 is driven by the electric power of the battery 19 (in Step S8). The operation of assisting the engine 14 by the motor 16 in Step S8 is continuously executed until it is determined that assisting the engine is disabled (as long as it is determined NO in Step S9).

When it is determined that assisting the engine is disabled in Step S7 and in Step S9, the process repeats Step S2.

As described above, according to the embodiment, when there is sufficient amount of charge of the battery 19, it is possible to stop the engine 14, and to drive the hydraulic pump 18 only by the output from the motor 16. This makes it possible to reduce the fuel consumption.

The specific embodiments described above mainly include the inventions having the following configurations.

Specifically, the invention provides a power transmission device for use in a hybrid construction machine. The power transmission device is provided with an engine; a generator which is configured to generate electric power by operation of the generator using power of the engine; a battery which is configured to store the electric power generated by the generator; a motor which is configured to be operated by the power of the engine and by the electric power of the battery; a hydraulic pump connected to the motor so as to be driven by operation of the motor; and a power divider connected to the engine, the generator, and the motor so that the power of the engine is distributed to the generator and to the motor.

According to the invention, the generator for generating electric power, and the motor for assisting the engine are individually provided, and the generator and the motor are connected to the engine via the power divider. According to this configuration, it is possible to directly utilize the power of the engine as the power of the motor (the hydraulic pump), while generating electric power by the power of the engine. On the other hand, it is possible to drive the hydraulic pump by operating the motor by the electric power of the battery. In other words, it is possible to assist the engine.

Accordingly, unlike a series hybrid system, the invention provides the following advantageous effects. Specifically, it is possible to directly utilize the power of the engine as the power of the hydraulic pump. Therefore, it is possible to suppress the output required for the motor, and to reduce the size of the motor. Further, when there is sufficient output of the engine, or when disorder occurs in the electrical system, it is possible to drive the hydraulic pump with use of the power of the engine.

Further, unlike a parallel hybrid system, the invention provides the following advantageous effects. Specifically, according to the invention, the generator for generating electric power, and the motor for assisting the engine are individually provided. Accordingly, it is possible to efficiently perform power generation and engine assist by selecting the generator having a rated output in accordance with the output at the time of generating electric power, and by selecting the motor having a rated output in accordance with the output at the time of assisting the engine.

Accordingly, the invention is advantageous in directly utilizing the power of the engine as the power of the hydraulic pump, and to efficiently perform power generation and engine assist.

In the power transmission device, preferably, the power divider may include a variable speed mechanism which changes the number of rotations of the engine so that the number of rotations of the generator is larger than the number of rotations of the motor.

According to the aspect, the number of rotations of the generator is set to be larger than the number of rotations of the motor by the variable speed mechanism. Accordingly, it is possible to reduce the size of the generator and to enhance the power generation efficiency. Specifically, if the number of rotations of the generator can be increased in obtaining a required output, it is possible to reduce the capacity of the generator. This makes it possible to reduce the size of the generator. Further, the larger the number of rotations of the generator is, the easier it is to drive the generator with high efficiency. Thus, increasing the number of rotations of the generator makes it possible to enhance the power generation efficiency.

In the power transmission device, preferably, the variable speed mechanism may be configured to transmit the power of the engine to the generator in a state that the number of rotations of the engine is increased, and the power divider may be configured to transmit the power of the engine to the motor in a state that the number of rotations of the engine is maintained.

According to the above aspect, it is possible to increase the number of rotations of the generator with respect to the number of rotations of the engine as a reference, and to maintain the number of rotations of the motor. Accordingly, it is possible to utilize the hydraulic pump for use in a construction machine configured such that the engine and the hydraulic pump are directly connected to each other, without changing the specifications of the hydraulic pump, while reducing the size of the generator and enhancing the power generation efficiency. Thus, it is possible to commonalize the hydraulic pump for a plurality of kinds of construction machines.

Preferably, the power transmission device may be further provided with a clutch which is switchable between a connected state that a power transmission route between the power divider and the motor is connected, and a disconnected state that the power transmission route between the power divider and the motor is disconnected; a charge amount detector which is configured to detect an amount of charge of the battery; and power control means which switches the clutch to the disconnected state, allows the motor to operate by the electric power of the battery, and further allows the engine to stop, when the amount of charge of the battery detected by the charge amount detector is not smaller than a predetermined value.

According to the above aspect, it is possible to stop the engine, and to drive the hydraulic pump only by the output of the motor, when there is sufficient amount of charge of the battery. This makes it possible to reduce the fuel consumption.

Specifically, the power control means may include a clutch switching member which switches the clutch between the connected state and the disconnected state; a motor controller which controls driving of the motor; an engine controller which controls driving of the engine; and a power controller which outputs a control command to the clutch switching member, the motor controller, and the engine controller, based on a detection result from the charge amount detector.

Further, the invention provides a hybrid construction machine provided with a hydraulic actuator, and the power transmission device including the hydraulic pump which drives the hydraulic actuator.

INDUSTRIAL APPLICABILITY

According to the invention, it is possible to directly utilize the power of the engine as the power of the hydraulic pump, and to efficiently perform power generation and engine assist.

REFERENCE SIGNS LIST 1 hybrid shovel (hybrid construction machine)
4 power transmission device
14 engine
15 generator
16 motor
17 power divider
18 hydraulic pump
19 battery
20 generator controller
21 motor controller
22 power controller
23 variable speed mechanism (speed change mechanism)
24 clutch
25 clutch switching member
26 charge amount detector
27 engine controller

The invention claimed is:

1. A power transmission device to be provided to a hybrid construction machine, comprising:
   an engine;
   a generator which is configured to generate electric power by operation of the generator using power of the engine;
   a battery which is configured to store the electric power generated by the generator;
   a motor which is configured to be operated by the power of the engine and by the electric power of the battery;
   a hydraulic pump connected to the motor so as to be driven by operation of the motor; and
   a power divider connected to the engine, the generator, and the motor so that the power of the engine is simultaneously distributed to the generator and to the motor,
   wherein the power divider includes a gear mechanism having a gear ratio that is set so that the number of rotations of the generator is larger than the number of rotations of the motor when distributed.

2. The power transmission device according to claim 1, wherein the gear ratio is set so that the number of rotations of the generator is larger than the number of rotations of the engine, and the number of rotations of the motor is equal to the number of rotations of the engine.

3. The power transmission device according to claim 1, further comprising:
   a clutch which is switchable between a connected state that a power transmission route between the power divider and the motor is connected, and a disconnected state that the power transmission route between the power divider and the motor is disconnected;
   a charge amount detector which is configured to detect an amount of charge of the battery; and
   power control means which switches the clutch to the disconnected state, allows the motor to operate by the electric power of the battery, and further allows the engine to stop, when the amount of charge of the battery detected by the charge amount detector is not smaller than a predetermined value.

4. The power transmission device according to claim 3, wherein the power control means includes:
   a clutch switching member which switches the clutch between the connected state and the disconnected state;
   a motor controller which controls driving of the motor;
   an engine controller which controls driving of the engine; and
   a power controller which outputs a control command to the clutch switching member, the motor controller, and the engine controller, based on a detection result from the charge amount detector.

5. A hybrid construction machine, comprising:
   a hydraulic actuator; and
   the power transmission device of claim 1 including the hydraulic pump which drives the hydraulic actuator.

6. The power transmission device according to claim 1, wherein the gear ratio is set to a value corresponding to a ratio between a rated output of the generator and a rated output of the motor.

* * * * *